(No Model.) 8 Sheets—Sheet 1.

W. AIKIN & W. W. DRUMMOND.
MACHINE FOR MOLDING IN SAND.

No. 291,124. Patented Jan. 1, 1884.

Witnesses
P. F. Hodges
M. E. Halleck

Inventors.
Wm Aikin
Wm W Drummond
by
R. Mason
att (No Model.)  8 Sheets—Sheet 2.

W. AIKIN & W. W. DRUMMOND.
MACHINE FOR MOLDING IN SAND.

No. 291,124. Patented Jan. 1, 1884.

Witnesses.
A. Ruppert.
M. T. Hallick.

Inventors.
Wm Aikin
Wm W Drummond
by R Mason (No Model.) 8 Sheets—Sheet 3.

W. AIKIN & W. W. DRUMMOND.
MACHINE FOR MOLDING IN SAND.

No. 291,124. Patented Jan. 1, 1884.

Witnesses.
A. Ruppert
M. T. Halleck

Inventors.
Wm Aikin
Wm W Drummond
by
R. Mason
Atty.

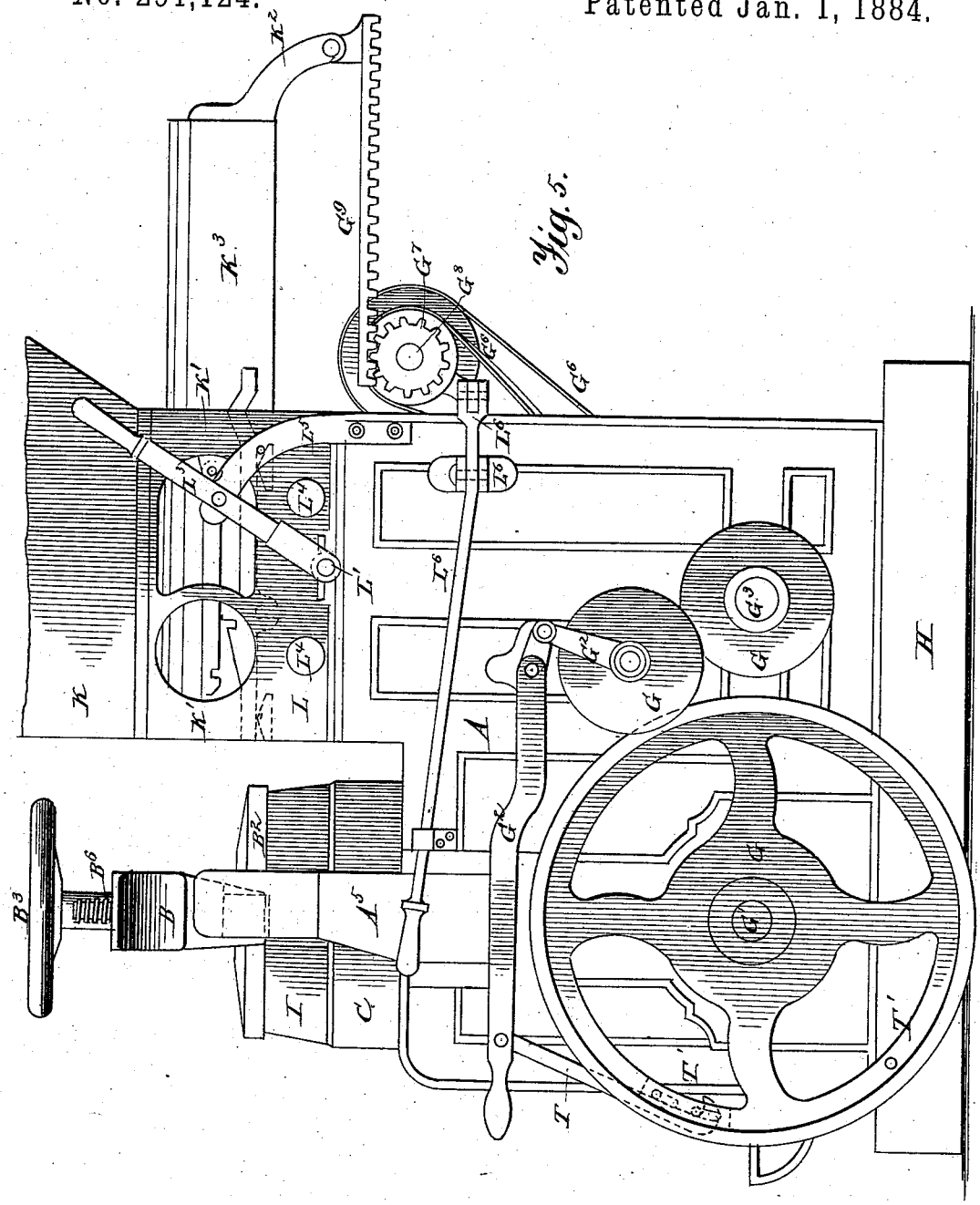

(No Model.) 8 Sheets—Sheet 5.

W. AIKIN & W. W. DRUMMOND.
MACHINE FOR MOLDING IN SAND.

No. 291,124. Patented Jan. 1, 1884.

Witnesses.
A. Ruppert.
M. F. Halleck

Inventors.
Wm Aikin
Wm W Drummond
by
R Mason
atty

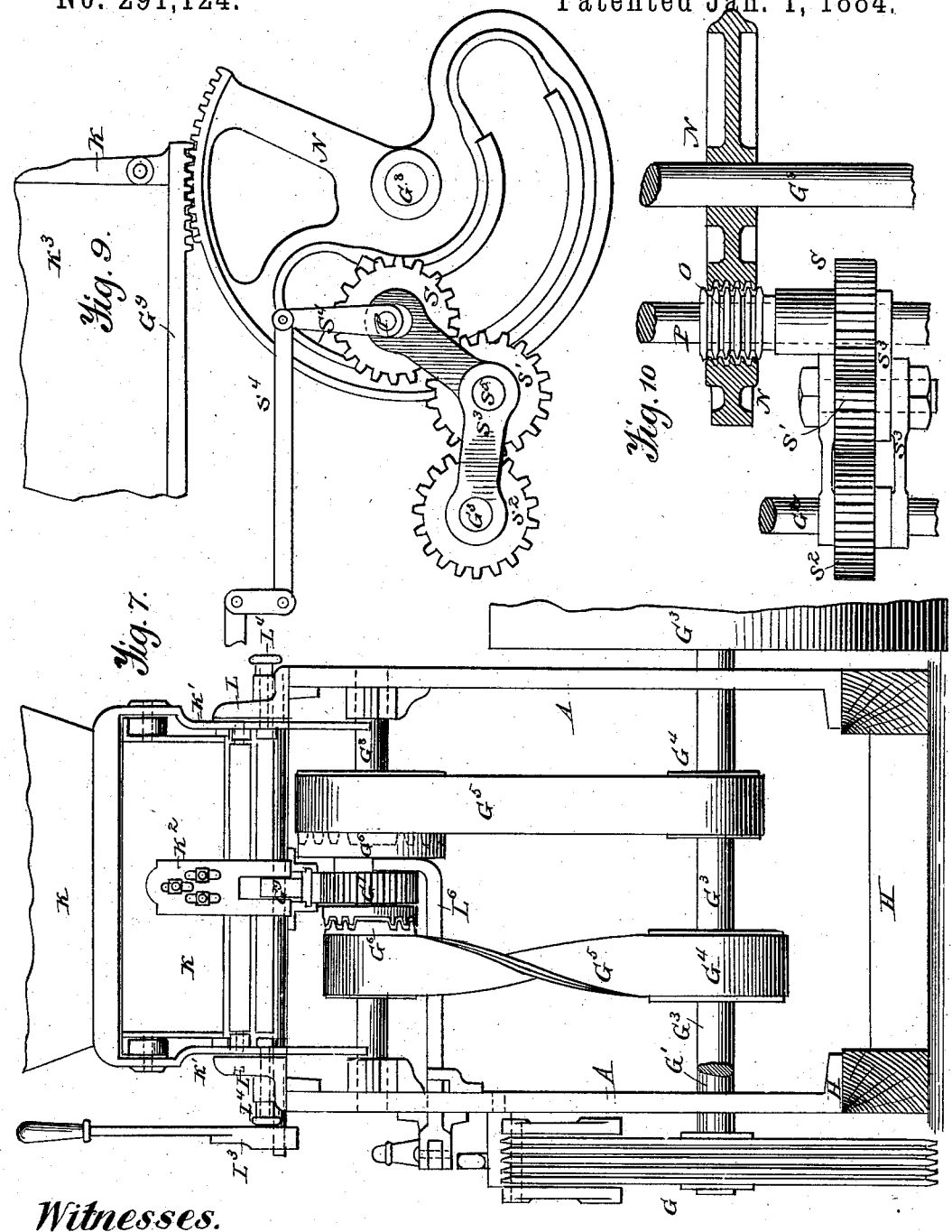

(No Model.) 8 Sheets—Sheet 7.
W. AIKIN & W. W. DRUMMOND.
MACHINE FOR MOLDING IN SAND.
No. 291,124. Patented Jan. 1, 1884.
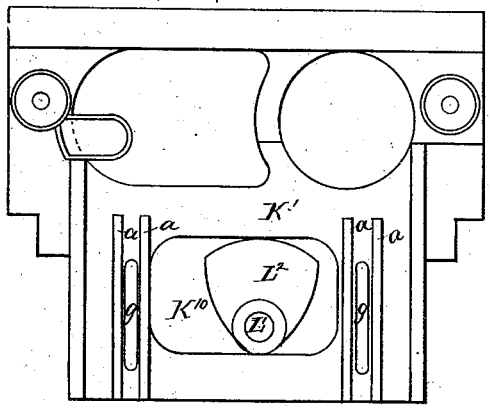
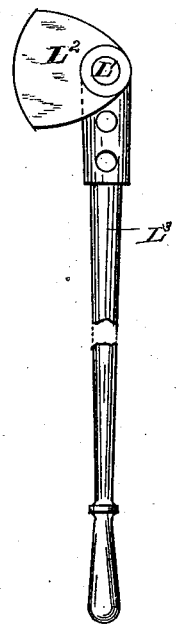
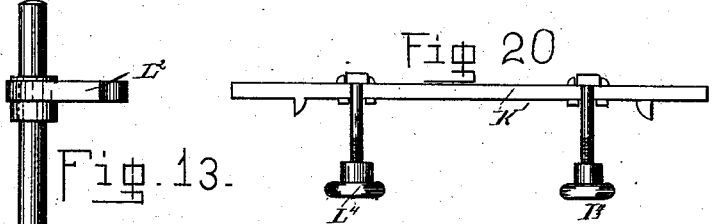
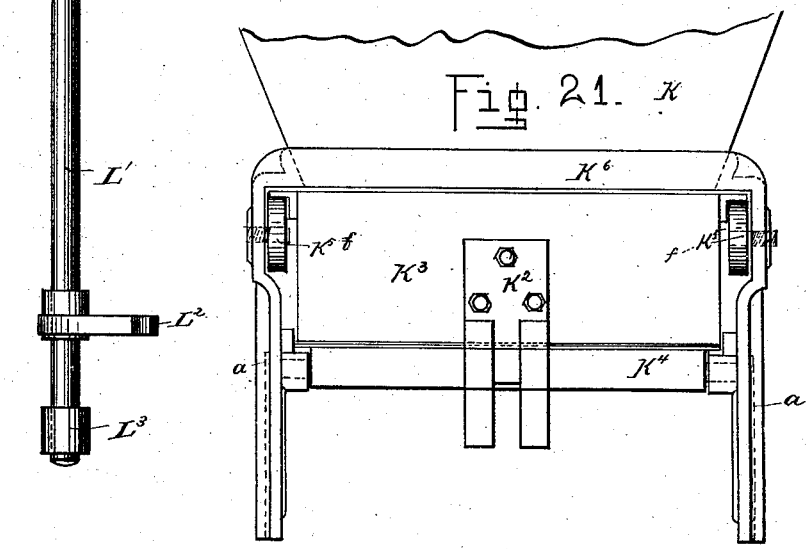
Witnesses:
E. T. Walker
Inventors:
Wm Aikin
Wm W Drummond
by R Mason atty

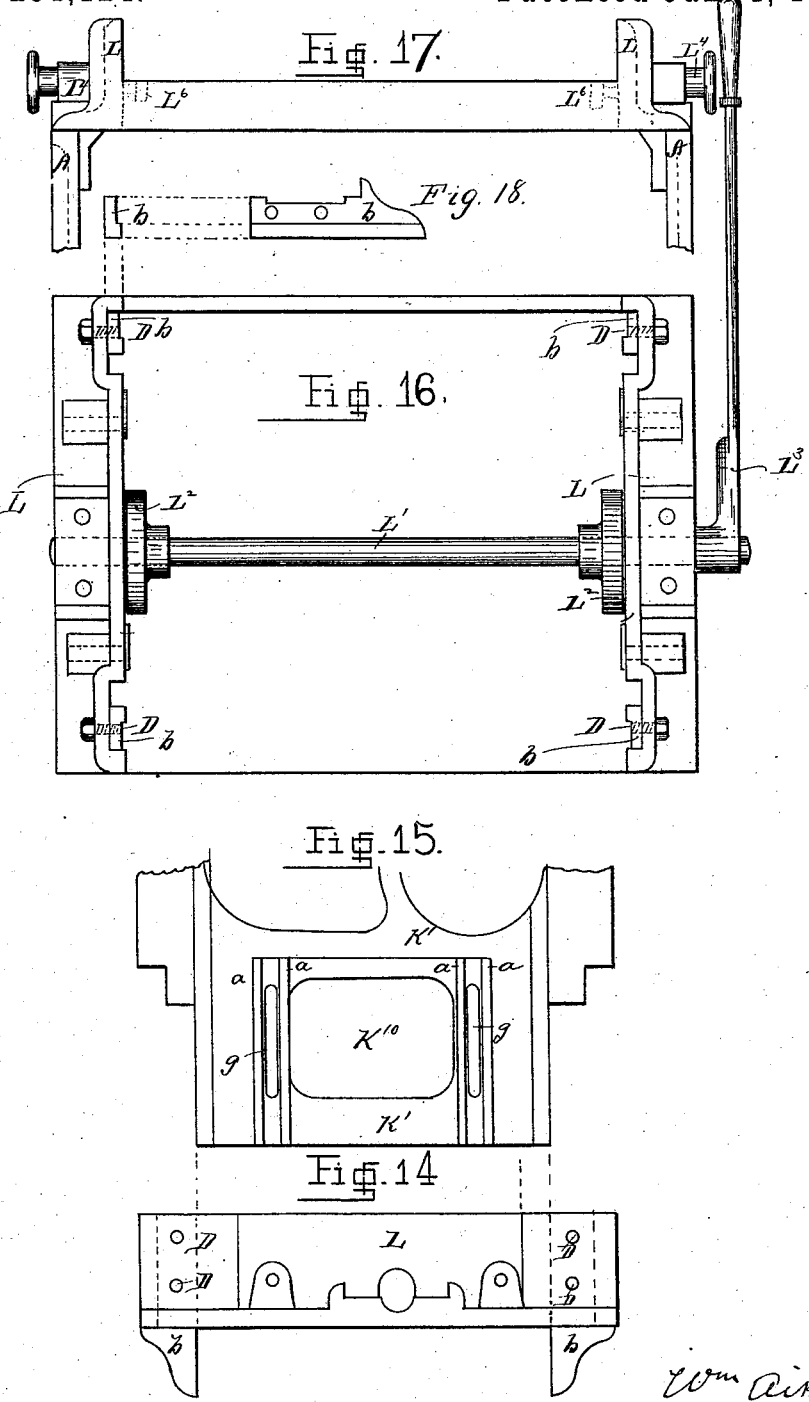

UNITED STATES PATENT OFFICE.

WILLIAM AIKIN AND WILLIAM W. DRUMMOND, OF LOUISVILLE, KENTUCKY.

MACHINE FOR MOLDING IN SAND.

SPECIFICATION forming part of Letters Patent No. 291,124, dated January 1, 1884.

Application filed May 14, 1883. (No model.)

*To all whom it may concern:*

Be it known that we, WILLIAM AIKIN and WILLIAM W. DRUMMOND, of Louisville, in the county of Jefferson, and State of Kentucky, have invented new and useful Improvements in Machines for Molding in Sand, of which the following is a specification.

The improvements which are the subject of this patent are made upon the machines as heretofore patented by us in divers Letters Patent of the United States—viz., Nos. 195,070, 195,071, 195,784, 195,785, 195,786, 201,377, 202,322, and 224,570—to which said several patents reference is made for the more full description of parts shown herein, but which it is not necessary to describe further than to explain the proposed modifications applied thereto.

Figure 1:
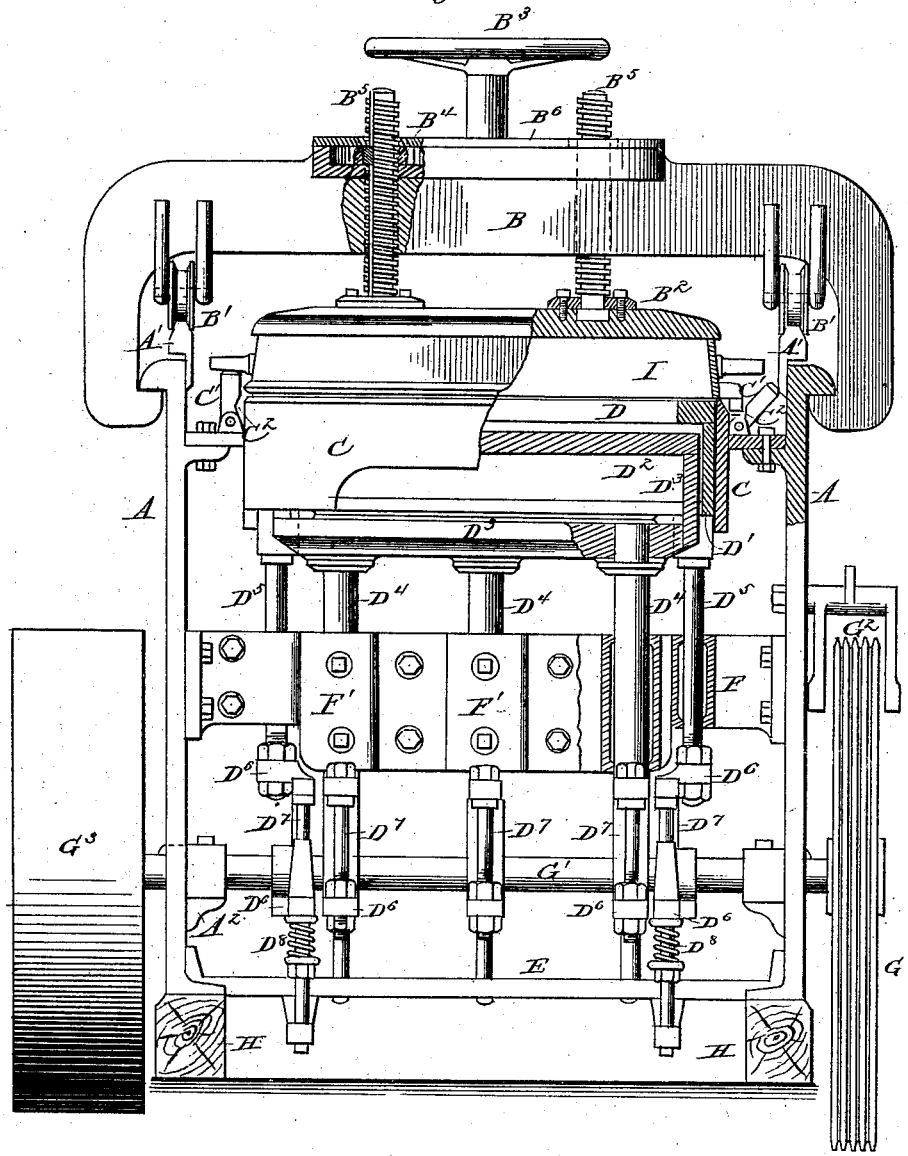
Figure 2:
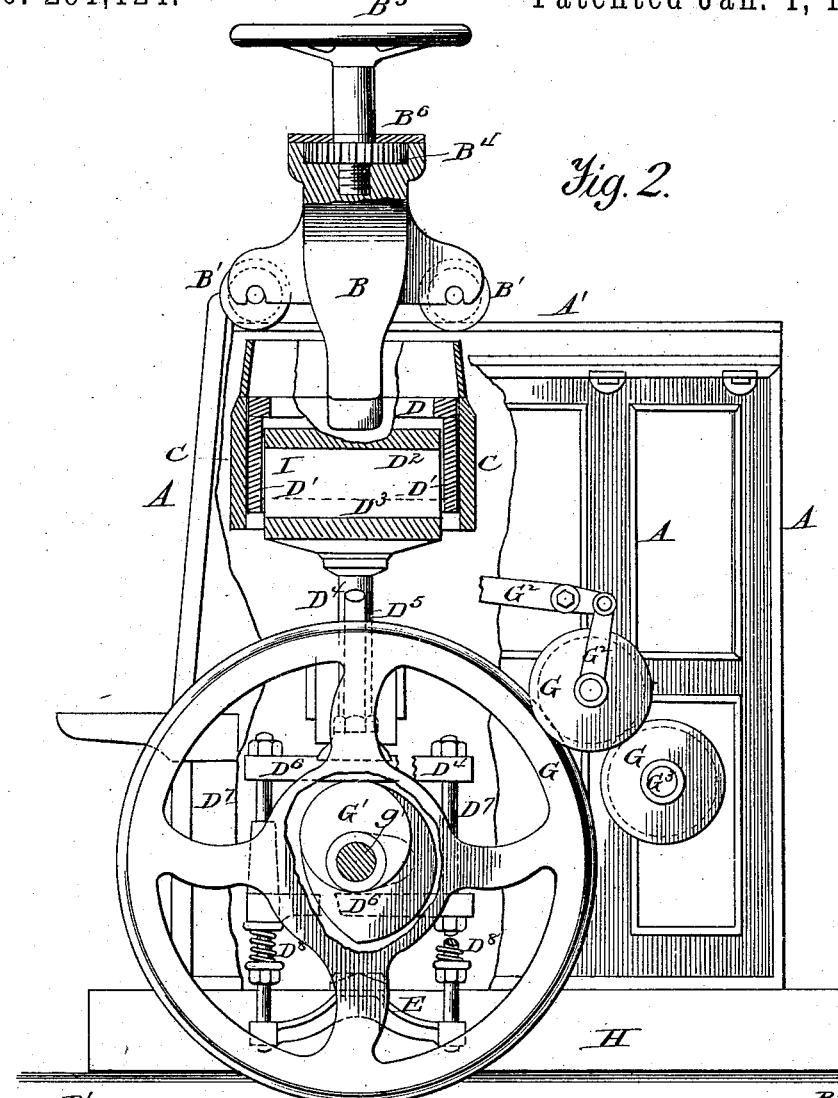
Figure 3:
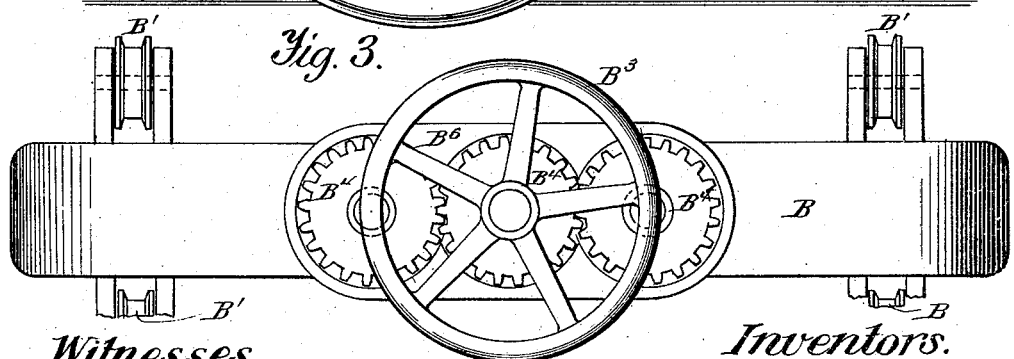
Figure 4:
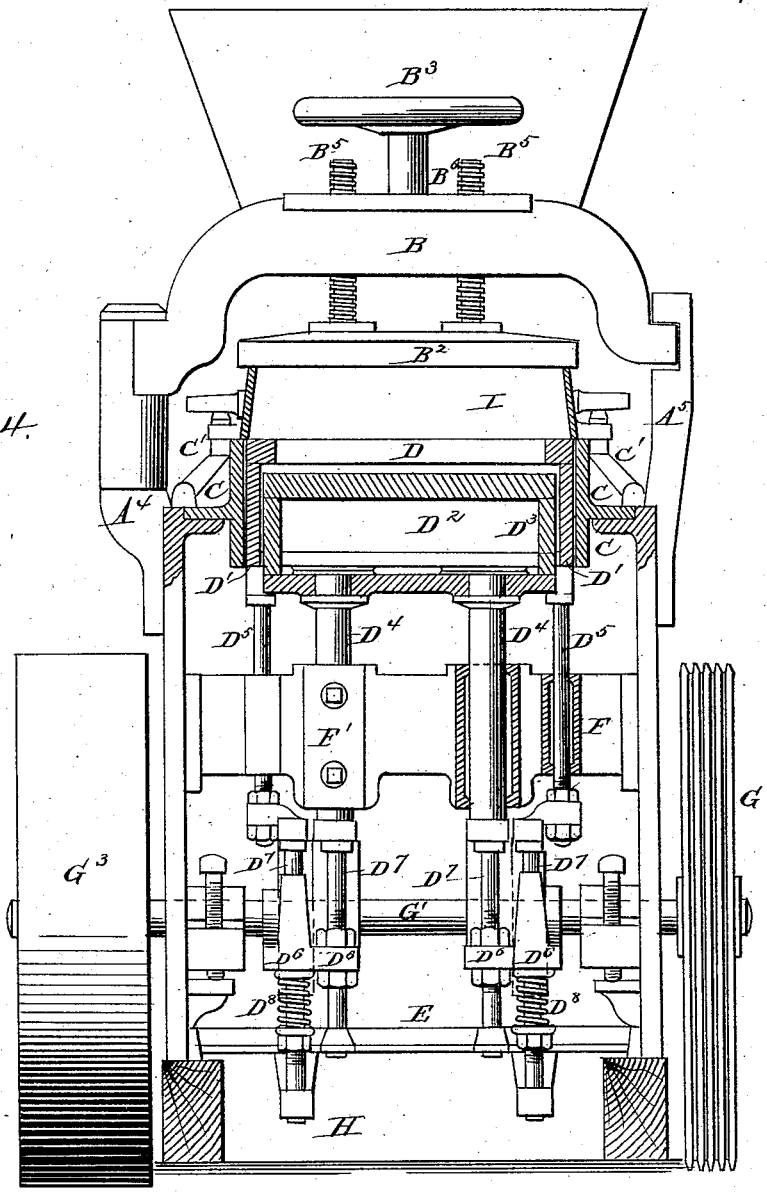
Figure 8:
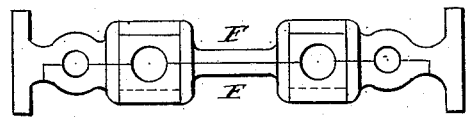
Figure 6:
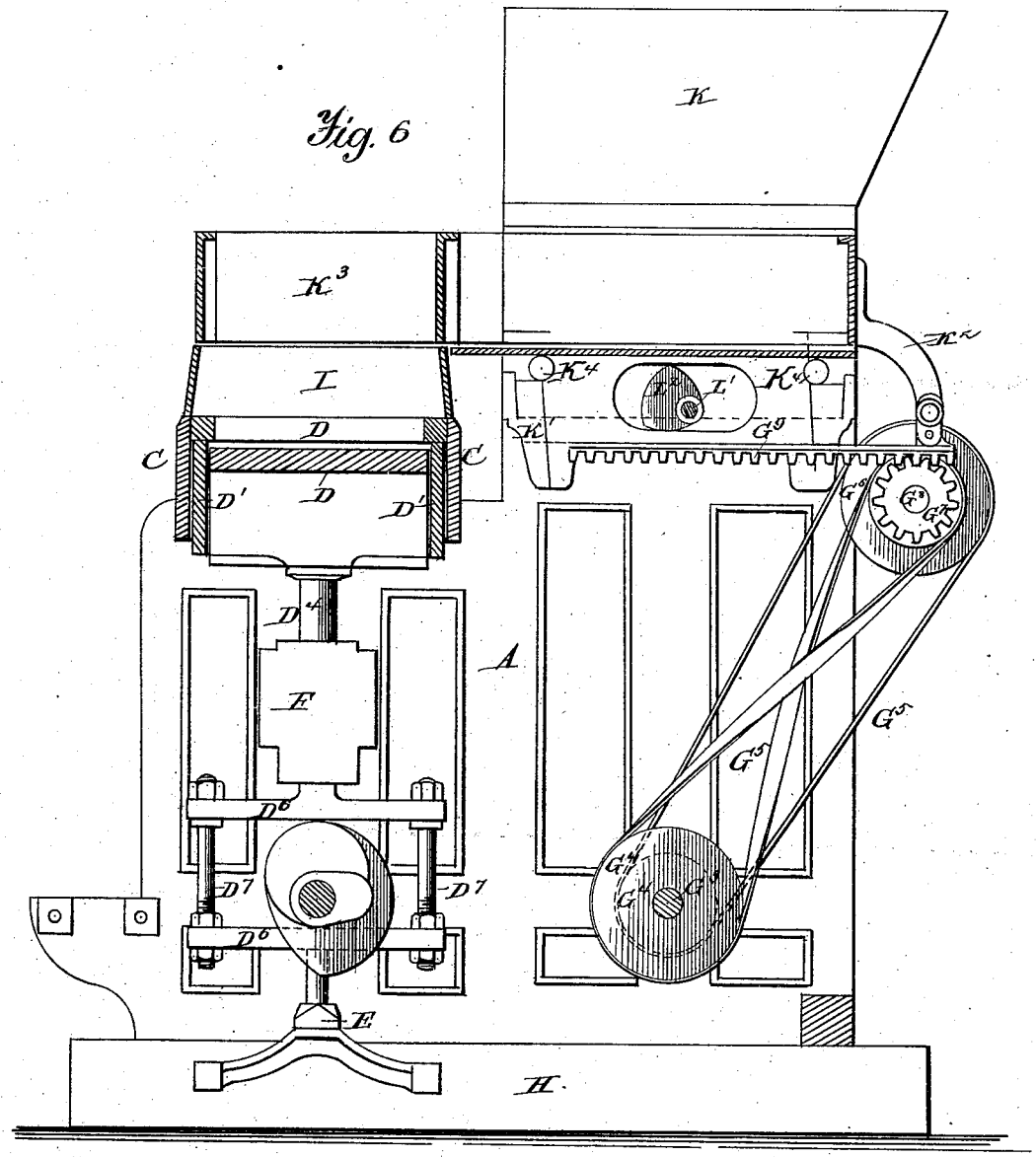

In the annexed drawings, which make part of this specification, Figure 1 is an elevation, partly in section, of one form of machine, in which the binder-plate travels on ways. Fig. 2 is an end elevation, also partly in section, of the same. Fig. 3 is a plan view of the parts which operate the binder-plate. Fig. 4 is a sectional elevation of a machine with a swinging binder-plate. Fig. 5 is an elevation of the same, showing the belt arrangement for actuating the sand-drawer. Fig. 6 is a vertical longitudinal section of the same. Fig. 7 is a transverse section of the same, the front shaft being broken away, showing also the shaft behind and in line with it. (The smaller friction-wheels are omitted.) Fig. 8 is a plan of the guide for the plungers or rods which communicate movement to the pattern-head and sectional follower. Fig. 9 is an elevation showing an arrangement of gearing for actuating the sand-drawer. Fig. 10 is a sectional plan view of the driving mechanism therefor, and Fig. 11 is a section of the driver of the cam-shaft and attachment for automatically stopping the same. Fig. 12 is an elevation showing the lever and one of the cams for lifting the hopper. Fig. 13 is a side view of same. Fig. 14 is an elevation of the guide-frame L. Fig. 15 is an elevation of the hopper-frame. Fig. 16 is a plan of the guide and hopper frame. Fig. 17 is an elevation showing the same as attached to the main frame. Fig. 18 is an elevation of each of the guides $b$. Fig. 19 is an elevation of the hopper-frame. Fig. 20 is a plan of the same. Fig. 21 is an elevation of the hopper-frame, looking toward one end thereof.

The same letters are employed in all the figures in the indication of identical parts.

Of the general operation of the machine it is sufficient to say that the case illustrated is of one of our single-acting machines, in which the pattern is attached to the reciprocating plunger-head $D^2$, and, in connection with the open follower D, form the mold by compression of the sand in the flask I. The continuing rotation of the cams $G'$ retracts, first, slightly the pattern-head, and then the follower-head. These parts and the cam-actuating mechanism are all fully described in our said previous patents.

The sand is supplied to the sand-box C by a reciprocating drawer, $K^3$, taking it from a hopper, K, and the top of the flask I is closed by a binder-plate, $B^2$, which sustains the thrust of the plunger-heads D $D^2$, in a manner also described in said patents. The binder-plate (shown in Figs. 1 and 4) is carried on a binder-bar, B, which is supported upon friction-wheels $B'$, running on the ways $A'$, attached to the main frame A. The ways may be attached to the binder-bar, and the wheels journaled on the main frame. The binder-plate may be raised or lowered by means of the hand-wheel $B^3$, the shaft of which carries a spur-wheel engaging the corresponding pinions, as shown at $B^4$ in Fig. 3. These pinions are confined by the plate $B^6$, through which the threaded bars $B^5$ pass, the binder-bar being correspondingly threaded. When the pinions are revolved, they cause the bar $B^5$ to revolve, being connected thereto by means of a spline, which allows the bar to travel longitudinally in the eye of the pinion while rotating with it. Thus the rotation of the pinions causes the binder-plate to be raised and lowered equally at the two ends, so that when the flask I has been placed on the sand-box C and been filled with sand the binder-plate can be forced down upon it by a pressure equally applied to both ends, and when the mold has been formed and the flask is to be removed the plate can be raised and run off out of the way, traveling on the wheels and ways. When the flask is placed on the sand-box C, it needs to be secured against lateral displacement. The flask is made in two parts. These are held in place, when filled, by means of steady-pins on the cope engaging holes in lugs attached to the drag.

To provide means for holding either a cope or drag in place on the sand-box, we attach to the outside of the latter swinging pins C', attached, as shown, to lugs, and cut away to form recesses at C², in connection with the lugs. If the flask I is a cope which has the steady-pins attached, these pins C' are swung aside, as shown at the right hand in Fig. 1, and the steady-pins will be received into the recess C² on the sand-box. If the flask I is a drag which has the perforated lug attached, the pins C' are turned up so that the points will enter the holes in the lugs, as shown on the left of the same figure. These pins or sockets provide against the lateral displacement of the flask when resting on the sand-box.

It is sometimes desirable to stop the plunger-actuating mechanism during the progress of the work. Thus, when molding a cope, at the instant when the forward thrust of the plunger has completed the compression of the sand, in order to remove the sprue-stick; again, when the pattern has been withdrawn while the follower-plate holds up the sand, and again at the completion of the movement of the plunger-heads. We provide means for doing so automatically, as follows: The hand-lever G², actuating the intermediate wheel, stops or starts the large wheel G on the cam-shaft G'. To the long arm of this lever we pivot the hooked rod T, Fig. 5, and at proper places on the side of the rim of the driver we insert pins T', which, engaging the hooked rod T, draw down the long arm of lever G² and throw the driving-gearing out of mesh, thus automatically stopping the movement of the plungers at the proper intervals. The operator may, if he sees fit, hold the hooked rod out of the way of the pins, so as to permit the continuous rotation of the cam. As flasks may be of different depths, provision must be made therefor. This is done as follows:

K is the hopper, which is attached to the vertically-adjustable hopper-frame K', in which the drawer K³ slides in and out, so as to be alternately under the hopper and over a flask, first to be filled with sand, and then to fill the flask. This drawer is made with angle-pieces on upper part of its sides, and rests on friction-rollers K⁵, which work on stud-pins attached to the hopper-frame K'. The drawer-bottom rests on friction-rollers K⁴, which have their bearings also on the hopper-frame. The hopper-frame K', besides carrying the drawer on friction-rollers, has also openings at K¹⁰, forming cam-frames for the cams L², which operate therein to raise the hopper-frame, hopper, and drawer. The hopper-frame has also slots g and guide-ribs a, in which the screws L⁴ work to hold the frame in proper position. The working of the frame and the guide-frame can be seen from Figs. 14, 15, and 16.

L is the guide-frame. It is a metal frame fastened permanently to the main frame A, and has bearings for the cam-shaft L' and bosses for the tightening-screws L⁴, and to which are attached the guide-pieces b by bolts.

L² are two cams on the cam-shaft L', and L³ is a lever operated by hand and held in position by the segment L⁵, to which it is secured by a pin. The lower edge of the drawer may be adjusted to the upper edge of a flask as follows: If the machine, as adjusted in Figs. 5 and 6, is adapted to operate with, say, a five-inch flask, and it is desired to fill, say, a six-inch flask, the lever L³ being depressed until the cams L² are brought into the position shown in Fig. 19, the hopper-frame, hopper, and drawer will be raised, say, an inch. Before the frame is raised the screws L⁴ must be loosened, and again tightened when the frame, &c., have been raised. The capacity of the drawer being sufficient to contain sand enough to fill the larger-sized flask, whatever sand remains in the drawer after the smaller flask has been filled will be drawn back onto the drawer-bottom, remaining in the drawer.

In our Patent No. 224,570 we showed our means of actuating the sand-drawer automatically by means of an oscillating-arm and connecting-rod. We prefer to actuate it by the direct application of a pinion to a rack attached to the drawer. We have illustrated herein two modes of accomplishing this. One of these is shown in Figs. 9 and 10. Three pinions, S S' S², have their bearings in the links S³, which permit them to be shifted without changing their pitch-line in relation to one another. The pinion S² is keyed to the driving-shaft G³, and engages the pinion S', revolving on the pin S⁵, which connects the links, and it drives the pinion S, which is attached to a sleeve, which also carries a friction-wheel, O, which runs in the slot of a mangle-wheel, N, which idles on a shaft, G⁸, and has on its periphery cogs meshing into those of the rack G⁹, which carries the sand-drawer. The contact of the friction-wheel O (it may be cogged, if preferred) with one or the other face of the slot in the mangle-wheel is determined by the eccentric-shaft P, which carries the sleeve in such manner that by raising or lowering the lever S⁴ the wheel O may be brought into contact with one side of the slot to draw the drawer under the hopper, or with the other to project the drawer over the sand-box. (See No. 224,570.)

Another mode of actuating the rack G⁹ by a pinion is shown in Figs. 5, 6, and 7. Two pulleys, G⁴, are attached to the driving-shaft G³, and by means of the two belts G⁵ (one of which is crossed) communicate rotation, in opposite directions, to the pulleys G⁶, running loose on the shafts G⁵. The pinion G⁷ engages the rack G⁹, and is caused to rotate in one or the other direction by means of a friction or other clutch connection with one or the other of the pulleys $G^6$, which idle on the shaft $G^8$, while the pinion $G^7$ is coupled to it by a groove and spline, and may be switched from one position to another by a lever, $L^6$.

What we claim as our invention, and desire to secure by Letters Patent, as improvements in machines for molding in sand, is—

1. In combination with the binder-plate, the hand-wheel $B^3$ and system of three spur-pinions, $B^4$, and traveling, threaded, and grooved bars $B^5$, the eyes of the exterior pinions being provided with splines to fit the grooves across the threads, so that the bars, while rotating with their respective pinions, shall also travel longitudinally through them, substantially as set forth.

2. The combination, with the sand-box and flask, of swinging pins and sockets for confining in place either cope or drag, substantially as set forth.

3. In combination with the plunger-head and actuating-wheel and the driver-wheel, the intermediate wheel for communicating motion from the driver-wheel to the cams, and the detaching mechanism, substantially as shown, for throwing the wheels out of gear automatically.

4. In combination with the sand-box, the hopper, hopper-frame, and drawer, and raising and lowering mechanism for adjusting the level of the lower edge of the drawer to that of the top of a flask carried on the sand-box, whereby sand may be supplied in quantities proper for filling flasks of different depths, substantially as set forth.

5. The combination, with the sand-drawer and its bottom, of the vertically-adjustable hopper, and the cams and lever for raising and lowering the hopper, substantially as set forth.

6. In combination with the sand-box, hopper, and drawer, a rack attached to the drawer, and a pinion, having rotation in different directions, engaging the rack to project and retract the drawer, substantially as set forth.

7. The combination, with the sand-drawer, of the pinion $G^7$, engaging directly into the rack, and the pulleys, belts, and clutch for rotating the pinion in one direction or the other, substantially as set forth.

In testimony whereof we affix our signatures in presence of two witnesses.

WILLIAM AIKIN.
WM. W. DRUMMOND.

Witnesses:
A. L. WHITE,
W. T. DRUMMOND.